United States Patent
Blechschmidt et al.

(10) Patent No.: US 8,081,736 B2
(45) Date of Patent: Dec. 20, 2011

(54) METHOD AND APPARATUS FOR MEASURING ELECTRICAL PROPERTIES OF COMMUNICATION LINES

(75) Inventors: Klaus Blechschmidt, Ilmmuenster (DE); Michael Schönberger, Poing (DE); Günter Wippich, Markt Schwaben (DE); Thomas Linder, Spittal (AT); Chris Springett, Coventry (GB)

(73) Assignee: Lantiq Deutschland GmbH, Neubiberg (DE)

( * ) Notice: Subject to any disclaimer, the term of this patent is extended or adjusted under 35 U.S.C. 154(b) by 1345 days.

(21) Appl. No.: 11/117,075

(22) Filed: Apr. 28, 2005

(65) Prior Publication Data
US 2005/0258841 A1 Nov. 24, 2005

(30) Foreign Application Priority Data

Apr. 28, 2004 (EP) .................... 04252460

(51) Int. Cl.
  H04M 1/24 (2006.01)
  H04M 3/08 (2006.01)
  H04M 3/22 (2006.01)
(52) U.S. Cl. ..................... 379/24; 379/29.03; 379/30
(58) Field of Classification Search .............. 379/22.03, 379/1.01, 22–22.02, 22.07, 22.08, 23, 24, 379/26.01, 26.02, 27.04, 29.01, 29.03, 29.04, 379/30, 27.01
See application file for complete search history.

(56) References Cited

U.S. PATENT DOCUMENTS

| 4,634,964 A | 1/1987 | Chattler |
| 5,202,882 A | 4/1993 | Rudolf |
| 5,625,667 A | 4/1997 | Vogt, III V |
| 5,867,557 A * | 2/1999 | D'Andrea et al. .......... 379/15.02 |
| 5,870,451 A | 2/1999 | Winkler et al. |
| 5,881,129 A * | 3/1999 | Chen et al. ................. 379/26.02 |
| 6,453,016 B1 | 9/2002 | Chea, Jr. |
| 6,909,781 B1 | 6/2005 | Itri |
| 2002/0101980 A1 | 8/2002 | Ayoub et al. |
| 2002/0118819 A1 | 8/2002 | Li |
| 2004/0109540 A1* | 6/2004 | Forsberg ......................... 379/21 |
| 2005/0117732 A1* | 6/2005 | Arpin ....................... 379/221.01 |
| 2006/0193444 A1* | 8/2006 | Aufenast et al. ................ 379/22 |
| 2007/0230667 A1* | 10/2007 | Warner et al. .............. 379/27.01 |

FOREIGN PATENT DOCUMENTS

| EP | 0 580 947 A2 | 2/1994 |
| EP | 0 580 947 B1 | 2/1994 |
| EP | 0 808 053 A2 | 11/1997 |
| EP | 1 219 097 B1 | 4/2005 |

* cited by examiner

Primary Examiner — Quoc D Tran
(74) Attorney, Agent, or Firm — SpryIP, LLC (57) ABSTRACT

A method and an apparatus for measuring electrical properties of communication lines is presented, wherein the communication line comprises a first line and a second line, wherein the first line is connected to a first line driver and the second line is connected to a second line driver. At least one measurement for determining said properties of said communication line is performed with the first line driver or the second line driver set to a high impedance state. With this method and apparatus, detailed line testing can be performed without the need for additional elements in a communication circuit.

31 Claims, 5 Drawing Sheets

PRIOR ART

FIG 10

PRIOR ART

US 8,081,736 B2

METHOD AND APPARATUS FOR MEASURING ELECTRICAL PROPERTIES OF COMMUNICATION LINES

FIELD OF THE INVENTION

The present invention relates to a method and an apparatus for measuring electrical properties, e.g. resistances, of communication lines. In particular it relates to a method for measuring resistances of communication lines comprising a tip line and a ring line, like communication lines of POTS (Plain Old Telephone Service) communication systems.

BACKGROUND

In POTS or other communication system it is advisable to perform a regular testing of communication lines, for example communication lines running from a central office terminal to end users ("subscribers"). With such a regular line testing, deteriorations or faults of the communication lines can be detected quickly so that a possibly necessary repair can be performed. In such a line testing operation, in particular electrical properties of the communication line like resistances are measured.

Figure 9:
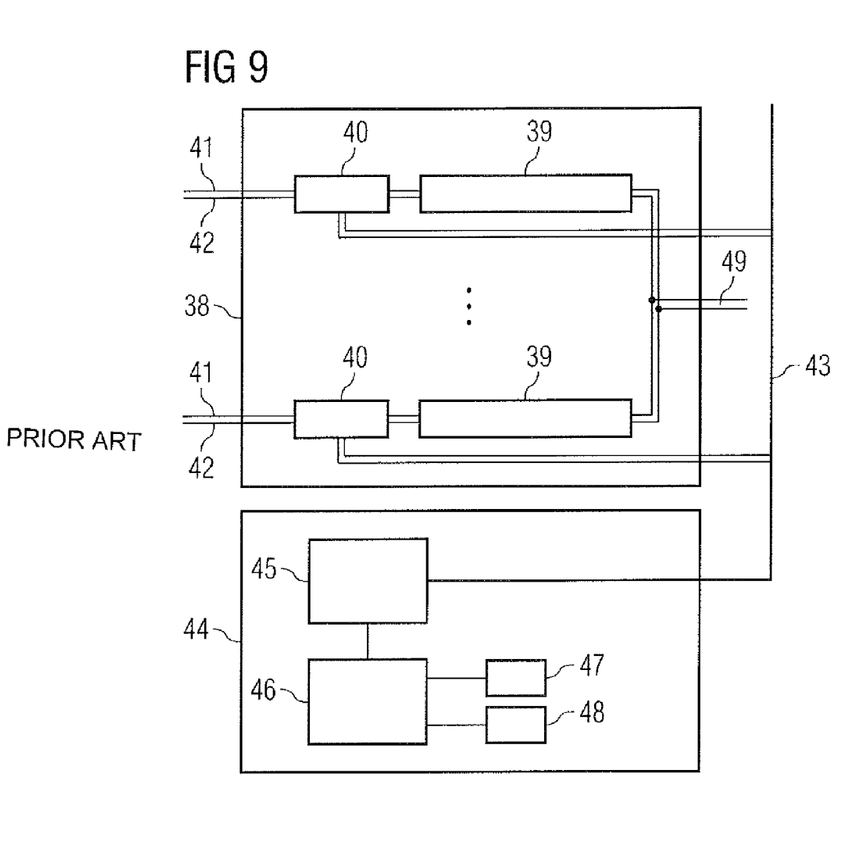
FIG. 9 shows a conventional apparatus for line testing.

In FIG. 9 a conventional set-up for line testing is shown. A linecard 38 has a plurality of POTS circuits 39, i.e. respective POTS chipsets for driving a plurality of pairs of communication lines, each pair comprising a tip line 41 and a ring line 42. A backplane connection 49 serves to connect the POTS circuits 39 with further circuitry for data processing.

Associated with each of the POTS circuits 39 is a test relay 40 which serves to selectively connect one pair of communication lines 41, 42 with a test bus 43. This test bus 43 leads typically to a test board 44 comprising analog circuitry 45, a digital signal processor 46, a random access memory (RAM) 47 and a read-only memory (ROM) 48. The components on the test board 44 serve to perform various tests like resistance measurements on the communication lines 41, 42 selectively connected with the test bus 43 via the respective test relay 40.

This solution needs a test relay 40 for each POTS circuit 39, i.e. for each subscriber line, and a separate test board 44. For each test board 44 which is normally present only once in a given system only one subscriber line can be tested simultaneously.

Figure 10:
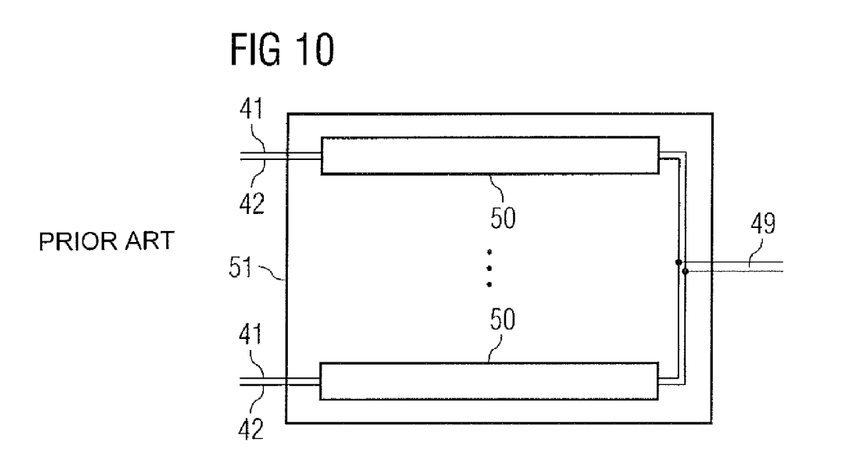
FIG. 10 shows another conventional apparatus for line testing.

An alternative approach is shown in FIG. 10. Here, a linecard 51 comprises a plurality of combined POTS circuits/digital signal processors (DSP) 50, each driving a subscriber line comprising a tip line 41 and a ring line 42. Again, the POTS circuits are connected via a backplane connection 49 with further circuitry. In this case, the test functions are integrated in the POTS circuits, for example in a respective subscriber line interface circuit (SLIC) or in a respective coder/decoder (CODEC). In known linecards of this type, only limited measurements can be performed on the subscriber lines since, for instance, an independent grounding of either the tip line 41 or the ring line 42 is not possible without additional circuitry, and therefore additional chip area is needed, causing additional costs. The method used here is based on applying a given voltage to the subscriber line and measuring the resulting current. With this method, only an overall resistance of the subscriber line can be measured.

SUMMARY

In view of the above, it is an object of the present invention to provide a method and an apparatus for measuring electrical properties of communication lines whereby no additional test relay or test board is needed and detailed measurements of specific electrical properties can be performed.

This object is achieved by a method and apparatus for measuring electrical properties of communication lines according to embodiments of the invention.

The invention provides a method for measuring electrical properties of communication lines, wherein the communication lines comprise a first line and a second line, wherein the first line is connected to a first line driver and the second line is connected to a second line driver. At least one measurement for determining said properties of said communication line is performed with the first line driver or the second line driver set to a high impedance state. In this respect, a high impedance state is a state of the respective line driver where no substantial current flows via the line driver. This high impedance state can be easily achieved by switching off the respective line driver.

This setting of a line driver to a high impedance state basically means, for measurement purposes, that the respective first line or second line is disconnected. Therefore, individual electrical properties like individual resistances can be easily determined.

In particular, the high impedance state is a state where a leakage current via the respective line driver is below 150 µA for a voltage range up to 150 V, corresponding to a resistance greater than 1 MΩ. Typical values are leakage currents below 30 µA.

In a preferred embodiment, the first line is a tip line and the second line is a ring line of a Plain Old Telephone Service (POTS) connection. The at least one measurement may, for example, comprise outputting a given voltage via one of the first and the second line drivers which is not set in a high impedance state and measuring the voltage and/or the current on the line.

A plurality of measurements comprising the at least one measurement may be performed. In particular, a first set of measurements with both line drivers in an active state, a second measurement with the first line driver in the high impedance state and a third measurement with the second line driver in the high impedance state may be performed, resulting in an equation system with which, for instance, a resistance between the first line, and the second line, a resistance between the first line and ground and a resistance between the second line and ground may be determined.

The functionalities needed for performing the method of the present invention are present in many present POTS chipsets, so that no additional circuitry is needed. In particular, the first line driver and the second line driver may be included in a subscriber line interface circuit (SLIC), whereas for performing the voltage measurements functionalities provided by an integrated circuit also serving as a coder/decoder (CODEC) may be used.

BRIEF DESCRIPTION OF THE DRAWINGS

Next, preferred embodiments of the present invention will be described in detail with reference to the accompanying drawings, wherein.

DETAILED DESCRIPTION

Figure 1:
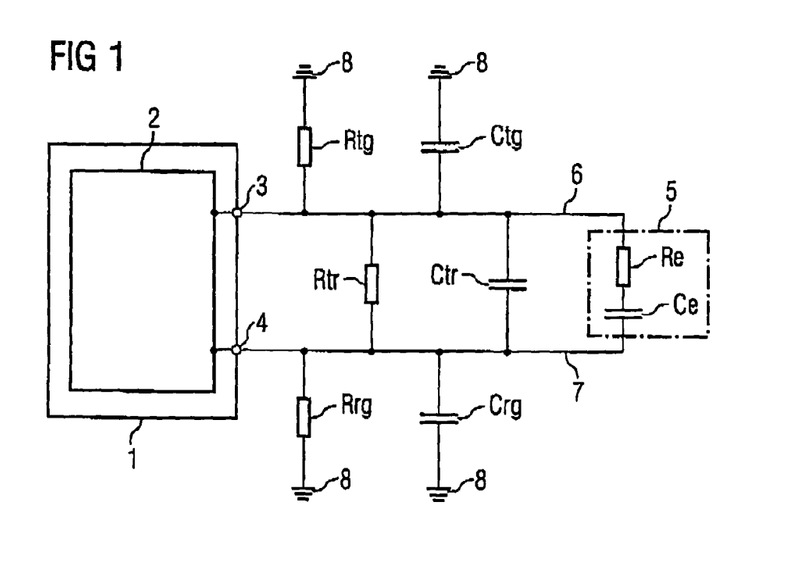
FIG. 1 shows an equivalent circuit of communication lines to be tested.

FIG. 1 shows an equivalent circuit of communication lines to be measured or tested together with a schematic representation of an apparatus, according to the present invention.

A linecard 1 comprises a Plain Old Telephone Service (POTS) chipset 2, which is, on the one hand, used for communication purposes, and, on the other hand, according to the present invention, used for performing measurements of electrical properties of communication lines. In the present case, the communication lines consist of a tip line 6 connected to a tip connector 3 and a ring line 7 connected to a ring connector 4 of the linecard 1. Electrical properties of the communication line include a resistance Rtr between tip line 6 and ring line 7, a resistance Rtg between tip line 6 and ground 8, a resistance Rrg between ring line 7 and ground 8, a capacitance Ctr between tip line 6 and ring line 7, a capacitance Ctg between tip line 6 and ground 8 and a capacitance Crg between ring line 7 and ground 8. Furthermore, in a connected state, at a far end of the communication lines a subscriber device 5 is present, represented by a resistance Re and a capacitance Ce connected in series. The resistances Rtg, Rrg and Rtr are basically leak resistances which, in a fault-free state of the communication lines, should be high. Measuring these resistances can give valuable information with respect to possible faults.

It should be noted that generally, a linecard 1 may comprise a plurality of POTS circuits or chipsets 2 connected to a plurality of subscriber lines, each subscriber line including a tip line and a ring line. For simplification, only one such POTS circuit is represented.

Figure 2:
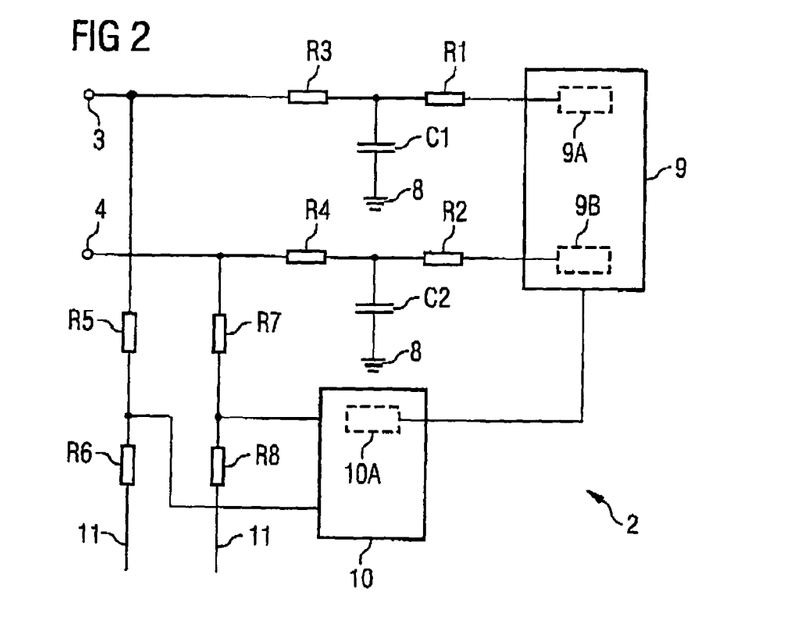
FIG. 2 shows a schematic circuit diagram of an embodiment of the present invention.

In FIG. 2, the POTS chipset 2 and the connections thereof are represented in greater detail. The POTS chipset 2 primarily comprises a subscriber line-interface circuit (SLIC) 9 and a further POTS integrated circuit, chip or chipset 10 which, for example, may provide coder/decoder (CODEC) or further signal processing functionalities. SLIC 9 and integrated circuit 10 together form the POTS chipset and work together in normal communication mode. Therefore, additional connections between SLIC 9 and integrated circuit 10 and also a backplane connection with further parts of the communication device are present which are not shown in FIG. 2 since they are not needed for performing the measurements according to the present invention.

SLIC 9 comprises a first line driver 9A and a second line driver 9B, the first line driver 9A being connected via resistors R1 and R3 to tip connector 3 for driving the tip line 6 of FIG. 1, and the second line driver 9B being connected via resistors R2 and R4 with ring connector 4 for driving the ring line 7. Additionally, in this connection, capacitors C1 and C2 are connected with ground 8 as shown in FIG. 2. Typical resistor values are 30Ω for R1 and R2 and 20Ω for R3 and R4.

The first line driver 9A and the second line driver 9B may be activated or deactivated; in a deactivated state they have a high impedance meaning that no or little leakage current may flow via the respective line driver. Typical values are leakage currents smaller than +/−30 µA for voltages up to 150 V, however, the leakage current in the deactivated or high impedance state may be as high as 150 µA corresponding to a resistance of the order of 1 MΩ.

The SLIC 9 further has the capability of measuring a current flowing from tip connector 3 to ring connector 4. Such a functionality is usually provided in commercially available SLICs since it is also needed in normal communication.

The integrated circuit 10 is a circuit which has the capability of measuring voltages. This capability usually is also present in some chips in commercially available POTS chipsets, e.g. for measuring a battery voltage. According to the resent invention, this functionality is used for line testing purposes.

Integrated circuit 10 is connected to tip connector 3 and ring connector 4 via respective voltage dividers, a first voltage divider comprising resistors R5 and R6 and a second voltage divider comprising resistors R7 and R8. Reference numeral 11 in FIG. 2 designates a reference voltage, for example a common mode voltage or ground, to which resistors R6 and R8 of both voltage dividers are connected. However, it is also possible to use different reference voltages for both voltage dividers. Typical values are 10 MΩ for R5 and R7 and 47 kΩ for R6 and R8. Since the resistors R5 and R7 have a high resistance, the current flowing to and from tip connector 3 and ring connector 4 is not disturbed, particularly not during normal operation.

Integrated circuit 10 comprises a built-in measurement control 10A which controls the measurements performed according to the present invention by SLIC 9 and integrated circuit 10. However, the control of the measurements which is usually realized by software may also be realized in SLIC 9 or in some other (not shown) part of the chipset which is also responsible for controlling the operation of SLIC 9 and integrated circuit 10 during normal communication operation.

Next, it will be shown how the circuitry of FIG. 2 is used according to the present invention to determine Rtg, Rtr and Rrg of FIG. 1.

Figure 3:
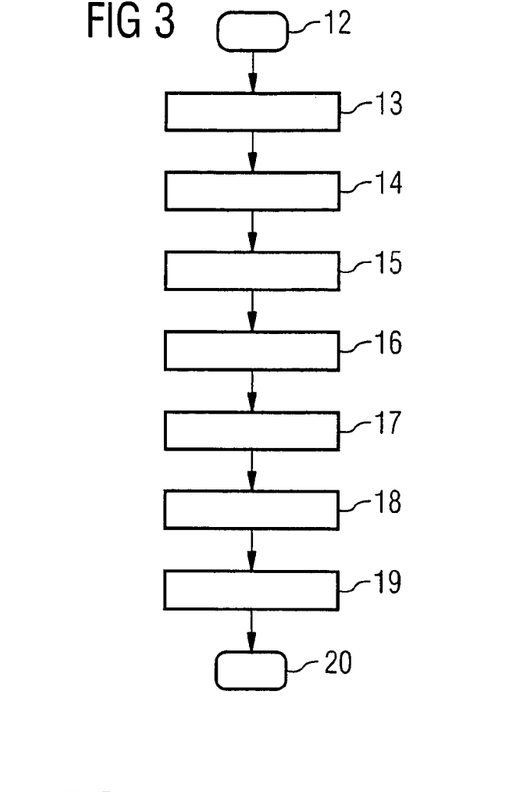
FIG. 3 shows a flow chart of a first set of measurements for measuring electrical properties of the communication lines of FIG. 1.

To achieve this object, in a preferred embodiment of the present invention three distinctive sets of measurements are performed. FIG. 3 shows a flow chart of the first set of measurements. During this first set of measurements, both line drivers 9A and 9B are active and may be used to apply a voltage to the tip line and the ring line, respectively.

In step 12 of FIG. 3, the first set of measurements is started. In step 13, a so-called transversal voltage is applied to the subscriber line consisting of tip line 6 and ring line 7, i.e. a voltage between tip line 6 and ring line 7 corresponding to a differential voltage being applied at tip connector 3 and tip connector 4. This is done by using the first line driver 9A and the second line driver 9B such that a voltage applied by first line driver 9A is greater than a voltage applied by second line driver 9B.

Next, in step 14, a voltage Vt1 at tip connector 3 and a voltage Vr1 at ring connector 4 are measured using integrated circuit 10, and a voltage difference ΔV1 is calculated by measurement control 10A according to ΔV1=Vt1−Vr1. This and the following calculations may, however, be performed in any suitable computing logic provided on linecard 1.

In step 15, a current It1 flowing between tip connector 3 and ring connector 4 is measured by SLIC 9. Of course, steps 14 and 15 may be performed simultaneously or in reverse order.

In step 16, a transversal voltage having the opposite sign as the transversal voltage applied in step 13 is applied to the subscriber line, i.e. the voltage applied by first line driver 9A is now smaller than the voltage applied by second line driver 9B. The magnitude of the transversal voltage applied in step 13 and the transversal voltage applied in step 16 may be of the same or approximately of the same magnitude.

In step 17, the voltage at tip connector 3 Vt2 and the voltage at ring connector 4 Vr2 are measured, and their difference ΔV2=Vt2−Vr2 is calculated, similar to the measurements and calculations performed in step 14. In step 18, the corresponding current It2 is measured similar to the current It1 measured in step 15.

Finally, in step 19, a resistance Ra, also called "active resistance", is calculated according to $$Ra = \frac{\Delta V1 - \Delta V2}{4(It1 - It2)} =: \frac{\Delta Vt}{4 \cdot \Delta It} \quad (1)$$

In step 20 the first set of measurements ends.

The resistance Ra may be calculated from the resistances Rtg, Rtr and Rrg using Kirchchoff's rules, yielding $$Ra = \frac{1}{\frac{4}{Rtr} + \frac{1}{Rtg} + \frac{1}{Rrg}} \quad (2)$$

Figure 4:
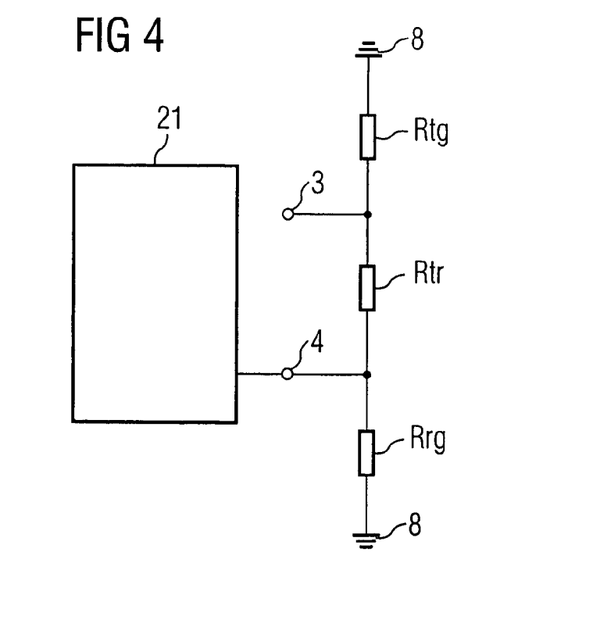
FIG. 4 shows an equivalent circuit of a state in which a second set of measurements is performed.

For a following second set of measurements, line driver 9A of FIG. 2 is deactivated, i.e. set in a high impedance state as explained above. The resulting equivalent circuit is represented in a simplified form in FIG. 4. Block 21 in FIG. 4 represents SLIC 9 together with the resistors R1-R4 and capacitors C1 and C2 used for connecting SLIC 9 with tip connector 3 and ring connector 4. Also, in FIG. 4 the connection of integrated circuit 10 is omitted since this remains the same as in FIG. 2. Furthermore, only the resistors Rtg, Rtr and Rrg of interest here are represented. As can be seen, deactivating line driver 9A practically results in disconnecting tip connector 3.

Figure 5:
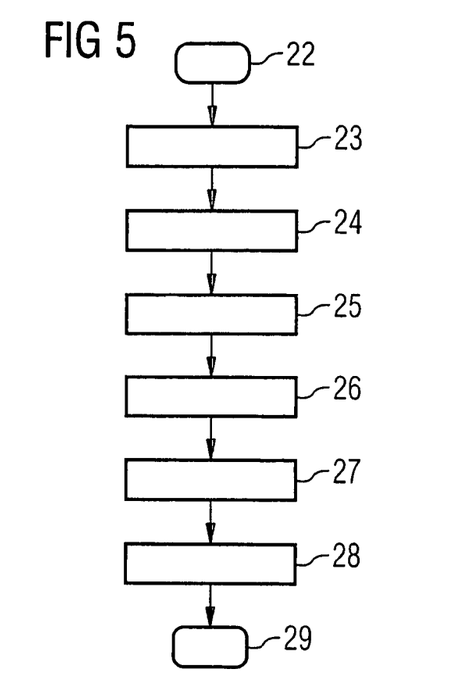
FIG. 5 shows a flow chart for performing the second set of measurements.

In this state, a second set of measurements schematically represented in the flow chart of FIG. 5 are performed. Step 22 starts this second set of measurements. In step 23, line driver 9A is deactivated, i.e. set to a high impedance state, to establish the state represented in FIG. 4, and a voltage is applied to ring connector 4, using for example line driver 9B. Next, using integrated circuit 10, the voltages at tip connector 3 versus ground Vtg1 and ring connector 4 versus ground Vrg1 are measured. This is now possible since tip connector 3 is virtually disconnected, in particular by using ground as reference voltage 11 of FIG. 2. In step 25, a second voltage different from the first voltage applied in step 23 is applied to ring connector 4. In step 26, again the voltages at tip connector 3 and ring connector 4 versus ground are measured, these voltages being designated by Vtg2 and Vrg2. In step 18, the differences ΔV3=Vtg1−Vtg2 and ΔV4=Vrg1−Vrg2 are calculated. Finally, in step 19, a ratio kht=ΔV3/ΔV4 is calculated. These calculations may again be performed by measurement control 10A integrated within integrated circuit 10 or in any other suitable computing facility. In step 20, the second set of measurements is ended.

By again using Kirchhoff's rules, it can be shown that $$kht = \frac{Rtg}{Rtr + Rtg} \quad (3)$$

Figure 6:
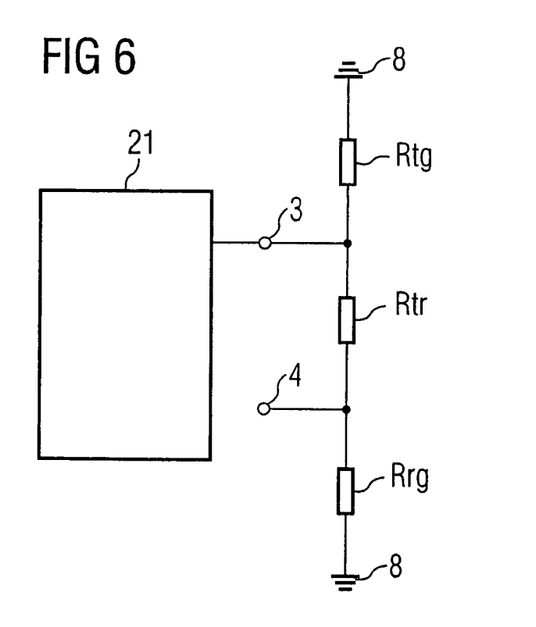
FIG. 6 shows an equivalent circuit of a state for performing a third set of measurements.

Finally, for a third set of measurements, the second line driver 9B is set to the high impedance state, resulting in the schematic equivalent circuit of FIG. 6. Compared to FIG. 4, the situation here is reversed, i.e. the tip line is connected and the ring line is practically disconnected.

Figure 7:
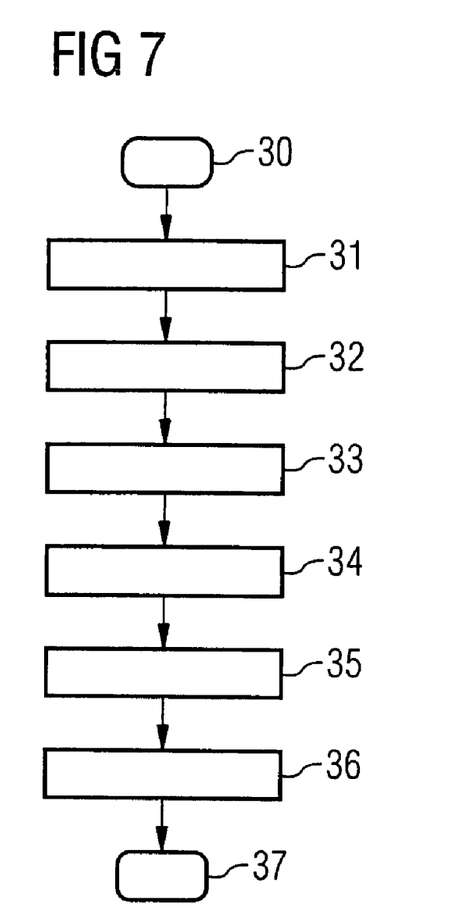
FIG. 7 shows a flow chart of the third set of measurements.

The third set of measurements represented in the flow chart of FIG. 7 basically corresponds to the second set of measurements of FIG. 5. In step 30, the third set of measurements is started. In step 31, a first voltage is applied to the tip connector 3 by the first line driver 9A with the second line driver 9B deactivated. In step 32, integrated circuit 10 is, like in step 24 of FIG. 5, used to measure a voltage Vtg3 between the tip connector 3 and ground and a voltage Vrg3 between the ring connector 4 and ground.

Next, in step 33, a second voltage is applied to tip connector 3, with the second line driver 9B still being deactivated in its high impedance state. In step 34, the same voltages as in step 32 are measured, designated Vtg4 and Vrg4.

In step 35, ΔV5=Vtg3−Vtg4 and ΔV6=Vrg3−Vrg4 are calculated. Finally, in step 36, the ratio khr=ΔV5/ΔV6 is calculated, and in step 37 the third set of measurements is ended. As stated before, these calculations may be performed in measurement control 10A.

Using Kirchhoff's rules again, it can be shown that $$khr = \frac{Rrg}{Rtr + Rrg} \quad (4)$$

So far, Ra, kht and khr have been determined, leading to the three equations (2), (3) and (4) for the three variables Rrg, Rtr and Rrg. By solving this set of equations, the variables can be determined. To achieve this, in a first step, equations (3) and (4) may be substituted into equation (2), yielding $$Rrg = \frac{Rtr \times khr}{1 - khr} \quad (5)$$

and $$Rtg = \frac{Rtr \times kht}{1 - kht} \quad (6)$$

Substituting equations (5) and (6) again in equation (2) yields the following result for Rtr:

$$Rtr = 2 \times Ra + \frac{Ra}{khr} + \frac{Ra}{kht} \quad (7)$$

After Rtr has been calculated according to equation (7), Rrg and Rtg may be calculated using this result and equations (5) and (6), respectively. The results thus calculated will represent the real line condition with a very good accuracy.

There may be cases where Rtr has a high value compared to the resistances Rtg and Rrg which represent leakages between the tip line and the ring line and ground, respectively. In an even more extreme case, there may be no connection between tip line and ring line, resulting in Rtr being infinite. In this case, as can be seen from equations (5) and (6), the method represented above for calculating Rrg and Rtg is not suitable. In the following, an easy way for determining Rtg and Rrg for this case is presented.

Figure 8:
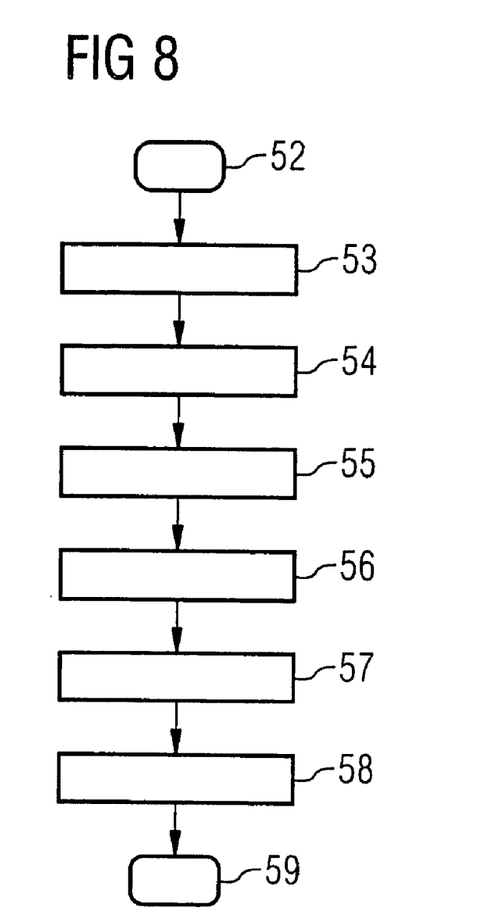
FIG. 8 shows a flow chart for a calculation of a resistance between a line and ground when a resistance between two lines is high.

In FIG. 8, a flow chart for a set of measurements usable to determine Rrg in case Rtr is high or infinite is shown. In step 52, the measurements for calculating Rrg are started. In step 53, a voltage is applied to ring connector 4, e.g. by line driver 9B, while line driver 9A is set to its high impedance state, i.e. the state shown schematically in FIG. 4. In step 54, the voltage between ring connector 4 and ground Vrg5 is measured by integrated circuit 10, and the current It3 between tip connector 3 and ring connector 4 is measured by SLIC 9. Although line driver 9A is set to its high impedance state, some current will flow due to leakage via resistances Rrg and Rtg to ground.

In step 55, a second voltage different from the voltage applied in step 53 is applied to ring connector 4 by line driver 9B, line driver 9A still being in its high impedance state. In step 56, the same voltage and current as in step 54 are measured as described above, designated by Vrg6 and It4. In step 57, $\Delta V7=Vrg5-Vrg6$ and $\Delta It3=It3-It4$ are calculated. Finally, in step 58, $Rht=\Delta V7/(2\times\Delta It3)$ is calculated, e.g. by measurement control 10A. In step 59, the measurement and calculation procedure is ended.

Next, it will be shown that for the case mentioned above according to which Rtr is high or infinite, Rht corresponds to Rrg. It can be shown that $$Rht = \frac{1}{\frac{1}{Rrg} + \frac{1}{Rtr+Rtg}} \tag{8}$$

For Rtr having a large value, equation (8) can be simplified to $$Rht \approx \frac{1}{\frac{1}{Rrg}} = Rrg \tag{9}$$

i.e. Rht corresponds to Rrg in this case.

In a similar manner, Rtg may be calculated performing the same steps as shown in FIG. 8 for Rrg with the roles of the tip connector 3 and the ring connector 4 and the respective first and second line driver being reversed. This then leads to the determination of Rhr as follows:

$$Rhr = \frac{1}{\frac{1}{Rtg} + \frac{1}{Rtr+Rrg}} \approx Rtg \tag{10}$$

Consequently, it has been shown that according to the invention Rrg and Rtg may be easily determined even in case Rtr is high or infinite.

Of course, the measurements and calculation described above only serve as an exemplary embodiment. Using Kirchhoff's rules, many other possible sets of measurements may be carried out in order to determine the resistance values Rrg, Rtr and Rtg. For example, other combinations of voltages applied to tip connector 3 and/or ring connector 4 of FIGS. 1 and 2 may be used, together with respective voltage or current measurements, to obtain a different set of equations for calculating Rtg, Rrg and Rtr. Depending on the choice of measurements, these equations may however be more complicated to solve than the set of equations obtained with the measurements described above.

In principle, with a method like the one described above, also other electrical properties apart from Rtg, Rrg and Rtr could be determined. Also, if only one of the electrical properties of the communication line is of interest, the number of measurements may be reduced accordingly to only determine the desired property.

The invention claimed is:

1. A method for measuring electrical properties of a communication line that runs from a central office terminal to end users using a chipset operably coupled to the communication line, the communication line comprising a first line and a second line, the first line connected to a first line driver of the chipset and the second line connected to a second line driver of the chipset, the method comprising:
   a) setting the first line driver to a high impedance state using the chipset; and
   b) determining the electrical properties of the communication line by performing at least one measurement with the first line driver in the high impedance state using a measurement circuit of the chipset, the determining including:
      applying two different voltages to said second line while the first line driver is set to a high impedance state using the chipset; and
      measuring a current flowing via said second line and/or measuring a voltage present at said second line for each of the two different voltages using the measurement circuit.

2. The method according to claim 1, wherein step a) further comprises switching the first line driver off to set the first line driver to the high impedance state using the chipset.

3. The method according to claim 1, wherein the high impedance state is a state in which a leakage current flowing via the first line driver is below about 150 µA for voltages applied at least up to about 150 V.

4. The method according to claim 3, wherein the leakage current is below 30 µA.

5. The method according to claim 1, wherein the high impedance state of the first line driver comprises a state in which an impedance of the first line driver is at least 1 MΩ.

6. The method according to claim 1, wherein said electrical properties comprise at least one of the group consisting of a resistance between said first line and ground, a resistance between said second line and ground, and a resistance between said first line and said second line.

7. The method according to claim 1, wherein step b) further comprises:
   calculating said electrical properties using a difference between the two different applied voltages and a difference of said measured currents and/or said measured voltages using a measurement control of the measurement circuit.

8. The method according to claim 1, wherein step b) further comprises determining the electrical properties of the communication line by performing a plurality of measurements using the measurement circuit, at least one measurement with the first line driver in the high impedance state, the measurement control using the plurality of measurements to determine said electrical properties.

9. The method according to claim 8, wherein said plurality of measurements comprises a first set of measurements wherein neither the first line driver nor the second line driver is set to the high impedance state, a second set of measurements wherein only the first line driver is set to the high impedance state and a third set of measurements wherein only the second line driver is set to the high impedance state.

10. The method according to claim 8, wherein said plurality of measurements includes applying voltages to said second line, measuring voltages at said second line and/or measuring currents flowing via said second line.

11. The method according to claim 8, wherein said plurality of measurements comprises two identical measurements carried out under different initial conditions by the measurement circuit, and wherein said electrical properties are calculated by the measurement control using differences of measurement results of said two identical measurements.

12. The method according to claim 11,
wherein said different initial conditions are conditions in which different voltages are applied to said second line, and
wherein said electrical properties are calculated by the measurement control using the differences between the voltages applied in the two different initial conditions.

13. The method of claim 1, wherein said chipset comprises a line card, said first line of said communication line comprises a tip line connected to a tip connector of said line card, and said second line of said communication line comprises a ring line connected to a ring connector of said line card.

14. An apparatus for measuring electrical properties of a communication line that runs from a central office terminal to end users, the communication line comprising a first line and a second line, the apparatus comprising:
a first line driver connected to the first line and a second line driver connected to the second line; and
a control unit configured to control the measuring of said electrical properties, the control unit configured to set the first line driver to a high impedance state for at least one measurement in order to determine said electrical properties of said communication lines,
wherein the control unit is further operable to cause application of two different voltages to said second line, and to cause a measurement of a current flowing via said second line and/or a measurement of a voltage present at said second line for each of the two different voltages applied, and
wherein said control unit is further adapted to calculate said electrical properties using a difference between the two different applied voltages and a difference of said measured currents and/or said measured voltages.

15. The apparatus according to claim 14, wherein the high impedance state is a state in which the respective first line driver or second line driver is switched off.

16. The apparatus according to claim 14, wherein the high impedance state is a state in which a leakage current flowing via the first line driver is below 150 μA for voltages applied up to 150 V.

17. The apparatus according to claim 16, wherein the leakage current is below 30 μA.

18. The apparatus according to claim 14, wherein the high impedance state of the first line driver is a state in which the impedance of the first line driver is at least 1 MΩ.

19. The apparatus according to claim 14, wherein said electrical properties comprise at least one of the group consisting of a resistance between said first line and ground, a resistance between said second line and ground, and a resistance between said first line and said second line.

20. The apparatus according to claim 14, wherein the control unit is further configured cause a voltage to be applied to said second line, and to cause a measurement of a current flowing via said second line and/or a measurement of a voltage present at said second line.

21. The apparatus according to claim 14, wherein said control unit is operable to cause a plurality of measurements to be performed, and determine said electrical properties based on said plurality of measurements.

22. The apparatus according to claim 21, wherein said plurality of measurements comprises a first set of measurements wherein neither the first line driver nor the second line driver is set to the high impedance state, a second set of measurements wherein only the first line driver is set to the high impedance state and a third set of measurements wherein only the second line driver is set to the high impedance state.

23. The apparatus according to claim 21, wherein said plurality of measurements includes applying voltages to said second line, measuring voltages at said second line and/or measuring currents flowing via said second line.

24. The apparatus according to claim 21, wherein said plurality of measurements comprises two identical measurements carried out under different initial conditions, and wherein said electrical properties are calculated using differences of measurement results of said two identical measurements.

25. The apparatus according to claim 24, wherein said different initial conditions are conditions where different voltages are applied to said second line, and
wherein said electrical properties are calculated using the differences between the voltages applied in the two different initial conditions.

26. The apparatus according to claim 14, further comprising an integrated circuit in which the first line driver and the second line driver are integrated.

27. The apparatus according to claim 14, comprising an integrated circuit configured to measure voltages present at the first line and the second line.

28. The apparatus according to claim 27, further comprising a second integrated circuit in which the first line driver and the second line driver are integrated, and
wherein the second integrated circuit and the integrated circuit for measuring the voltages at the first line and the second line are further configured to effect communication via the communication lines.

29. The apparatus according to claim 14, wherein the communication line is a telephone system line, the first line is a tip line and the second line is a ring line.

30. The apparatus according to claim 29, wherein said apparatus is incorporated in a line card.

31. The apparatus according to claim 30, wherein said tip line is connected to a tip connector of said line card and said ring line is connected to a ring connector of said line card.

* * * * *

UNITED STATES PATENT AND TRADEMARK OFFICE
CERTIFICATE OF CORRECTION

| | | |
|---|---|---|
| PATENT NO. | : 8,081,736 B2 | Page 1 of 1 |
| APPLICATION NO. | : 11/117075 | |
| DATED | : December 20, 2011 | |
| INVENTOR(S) | : Blechschmidt et al. | |

It is certified that error appears in the above-identified patent and that said Letters Patent is hereby corrected as shown below:

In The Drawings

In Fig. 1, Sheet 1 of 5, delete "FIG" and insert -- FIG. --, therefor at each occurrence throughout the figures.

In The Specification

In Column 1, Line 35, delete "processor 46." and insert -- processor 46, --, therefor.

In Column 3, Line 43, delete "line-interface" and insert -- line interface --, therefor.

In Column 4, Line 11, delete "resent invention," and insert -- present invention, --, therefor.

In Column 5, Line 19, delete "Kirchchoff's rules," and insert -- Kirchhoff's rules, --, therefor.

In The Claims

In Column 10, Line 8, in Claim 21, delete "and determine" and insert -- and to determine --, therefor.

Signed and Sealed this
Seventh Day of June, 2016

Michelle K. Lee
*Director of the United States Patent and Trademark Office*